United States Patent
Soliman et al.

(10) Patent No.: US 8,647,231 B2
(45) Date of Patent: Feb. 11, 2014

(54) TRANSITIONING BETWEEN ELECTRIC-DRIVE AND PARALLEL-DRIVE IN A HYBRID-ELECTRIC VEHICLE POWERTRAIN

(75) Inventors: Ihab S. Soliman, Canton, MI (US); Fazal U. Syed, Canton, MI (US); Mark S. Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 505 days.

(21) Appl. No.: 12/831,325

(22) Filed: Jul. 7, 2010

(65) Prior Publication Data

US 2012/0010041 A1   Jan. 12, 2012

(51) Int. Cl.
| | |
|---|---|
| *B60W 10/06* | (2006.01) |
| *B60W 10/08* | (2006.01) |
| *B60W 10/02* | (2006.01) |
| *B60W 20/00* | (2006.01) |
| *F02N 11/00* | (2006.01) |

(52) U.S. Cl.
USPC ........... 477/5; 477/181; 903/930; 903/946

(58) Field of Classification Search
USPC ............... 477/5, 3, 181; 903/930, 946
See application file for complete search history.

(56) References Cited

U.S. PATENT DOCUMENTS

| | | | | |
|---|---|---|---|---|
| 7,617,808 | B2 * | 11/2009 | Aswani et al. ........... | 123/179.3 |
| 7,678,013 | B2 * | 3/2010 | Soliman et al. ............ | 477/5 |
| 7,691,027 | B2 * | 4/2010 | Soliman et al. ............ | 477/5 |
| 7,722,499 | B2 * | 5/2010 | Soliman et al. ............ | 477/5 |
| 7,828,694 | B2 * | 11/2010 | Silveri et al. ............ | 477/3 |
| 7,837,593 | B2 * | 11/2010 | Silveri et al. ............ | 477/5 |
| 7,892,139 | B2 * | 2/2011 | Kaltenbach ............ | 477/5 |
| 7,908,067 | B2 * | 3/2011 | Soliman et al. ............ | 701/54 |
| 7,998,024 | B2 * | 8/2011 | Silveri et al. ............ | 477/5 |
| 8,061,462 | B2 * | 11/2011 | Soliman et al. ........ | 180/65.265 |
| 8,062,171 | B2 * | 11/2011 | Soliman ............ | 477/3 |
| 8,075,436 | B2 * | 12/2011 | Bachmann ............ | 475/5 |
| 8,087,483 | B2 * | 1/2012 | Bucknor et al. ............ | 477/5 |
| 8,137,236 | B2 * | 3/2012 | Soliman et al. ............ | 477/15 |
| 8,257,222 | B2 * | 9/2012 | Silveri et al. ............ | 477/3 |
| 2003/0104901 | A1 * | 6/2003 | Fukushima et al. ............ | 477/3 |
| 2008/0064561 | A1 * | 3/2008 | Popp et al. ............ | 477/5 |
| 2008/0119320 | A1 * | 5/2008 | Wu et al. ............ | 477/5 |
| 2009/0145673 | A1 * | 6/2009 | Soliman et al. ............ | 180/65.1 |
| 2009/0233757 | A1 * | 9/2009 | Soliman et al. ............ | 477/3 |
| 2009/0233758 | A1 * | 9/2009 | Soliman et al. ............ | 477/3 |
| 2009/0234549 | A1 * | 9/2009 | Silveri et al. ............ | 701/70 |
| 2011/0139108 | A1 * | 6/2011 | Hashim ............ | 477/3 |

* cited by examiner

*Primary Examiner* — Justin Holmes
*Assistant Examiner* — Jacob S Scott
(74) *Attorney, Agent, or Firm* — David B. Kelley; MacMillan, Sobanski & Todd, LLC

(57) ABSTRACT

A method for operating a vehicle powertrain includes driving first wheels using an electric machine, starting an engine, using a second electric machine driven by the engine to produce synchronous speed at a input of a transmission having a desired gear engaged, engaging a clutch that connects said input and the engine, and using the engine and the transmission to drive second wheels.

21 Claims, 6 Drawing Sheets

| Mode | Engine State | Trans State | CISG State | ERAD State |
|---|---|---|---|---|
| Electric Drive | Off | Neutral | Zero Torque | Motoring /Generating |
| Series Drive | On | Neutral | Generating | Motoring /Generating |
| Parallel-Split Drive | On | Engaged | Zero Torque /Motoring/ Generating | Zero Torque /Motoring |

TRANSITIONING BETWEEN ELECTRIC-DRIVE AND PARALLEL-DRIVE IN A HYBRID-ELECTRIC VEHICLE POWERTRAIN

BACKGROUND OF THE INVENTION

1. Field of the Invention

This invention relates generally to a powertrain for a hybrid electric vehicle (HEV). More particularly, it pertains to the control of transitions between electric-drive and parallel-drive operation of the powertrain.

2. Description of the Prior Art

One of the more promising technologies to improve vehicle fuel efficiency is to hybridize a conventional vehicle powertrain with an electric drive system that consists of one or more electric machine and a high-voltage battery. The automotive industry is investing resources in developing such hybridized powertrain concepts and configurations in order to accelerate vehicle electrification and ultimately move towards plug-in hybrid or battery electric vehicles. These hybrid powertrain configurations can be categorized into three types, i.e., series hybrid system, parallel hybrid system, and complex hybrid systems. Complex hybrid systems provide the characteristics of both a series and parallel configurations. One such complex hybrid configuration is a Dual-Drive hybrid powertrain.

Hybrid electric vehicle (HEV) powertrains are important to developing environmentally friendly and fuel efficient vehicles. A "Dual-Drive" full hybrid electric vehicle overcomes some deficiencies over existing hybrid powertrain architectures due to their kinematic arrangement of engine, motors and driveline components. This hybrid powertrain comprised of conventional powertrain components as its base with an electric motor on the rear axle, and a crank integrated starter generator, engine and transmission on the front axle forms a complex configuration which provides fuel economy improvement over a conventional powertrain. However, due to this complex configuration, transitioning between electric and parallel hybrid drive modes presents a unique powertrain control challenge and requires coordinated vehicle and subsystem controls.

Since the Dual-Drive system provides independent propulsion capability on each drive axle, a need exists to control torque delivery between the front and rear axles during transitions between electric-drive and parallel-drive modes while providing responsive vehicle performance and acceptable drivability. Furthermore, due to the multiple degrees of freedom in controlling the powertrain under various operating modes, a need exists to develop an energy management control system to perform selection of the powertrain operating mode and blending of torque, speed, and power from multiple power sources such that the benefit from this hybridization is maximized. In addition, since the Dual-Drive hybrid powertrain uses a fixed stepped-ratio automatic transmission, a need exists for coordination of transmission control (i.e. shifts, engagements/disengagement, etc) during engine start/stops, regenerative braking and powertrain operating mode transitions.

SUMMARY OF THE INVENTION

A method for operating a vehicle powertrain includes driving first wheels using an electric machine, starting an engine, using a second electric machine driven by the engine to produce synchronous speed at a input of a transmission having a desired gear engaged, engaging a clutch that connects said input and the engine, and using the engine and the transmission to drive second wheels.

The dual-drive powertrain uses a conventional powertrain as its base, thereby leveraging existing powertrain components and manufacturing assets and applying them in multiple base powertrains, thereby providing multiple HEV powertrain applications.

In addition, the dual-drive hybrid powertrain provides the ability to drive two independent vehicle axles and to produce operation in front-wheel drive, rear-wheel drive or all-wheel drive. Moreover, it's flexible and modular design makes it readily scalable to large and small vehicle applications. It offers great flexibility for operating the powertrain in various modes, such as series-drive and parallel-drive, to satisfying driver's demands and achieving enhanced fuel efficiency and other vehicle performance desiderata.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figures 1, 2:
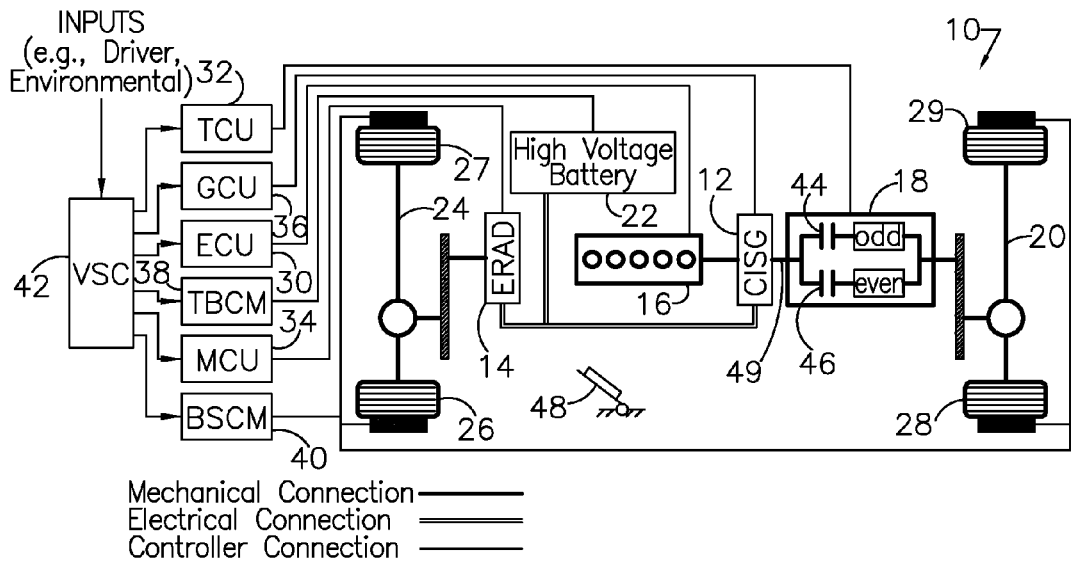
FIG. 1 is a schematic diagram showing components of a dual-drive hybrid-electric powertrain and associated controllers.
FIG. 2 is summary of the primary dual-drive hybrid powertrain operating modes.

Referring now to the drawings, there is illustrated in FIG. 1 a dual-drive hybrid powertrain 10, which includes two electric machines 12, 14; an internal combustion engine 16, such as an inline five cylinder diesel engine; and an automatic transmission, such as a six-speed wet dual-clutch automatic transmission (DCT). The first electric machine 12, called Crankshaft Integrated Starter/Generator, (CISG), is mechanically integrated between the engine 16 and transmission 18, which form a primary propulsion path to a first axle 20, preferably the front axle. The CISG 12 is responsible for engine start/stop and can be operated in a generating mode to convert mechanical energy from the engine to electrical energy, which is used either to charge a high voltage battery 22 or to power directly the second electric machine 14 during series-drive or parallel-drive modes. CISG 12 also acts as an additional propulsion source by directly transmitting torque to axle 20.

The second electric machine 14, called the Electric Rear Axle Drive (ERAD), is connected to a second axle 24, preferably the rear axle, in order to provide additional propulsion capability in either an electric-drive or hybrid-drive mode, resulting in two independently driven axles 20, 24. Since the ERAD 14 is coupled directly to the rear wheels 26, 27, it is also used for regenerative braking.

The CISG 12 and ERAD 14 are powered by the high-voltage (HV) battery 22 using inverters. In addition, by engaging or disengaging the transmission 18, the engine 16 and CISG 12 can be connected or disconnected from the front axle 20, thereby providing available series-drive, electric-drive and parallel-drive modes.

Control of the transmission can also be used to decouple the engine 16 and CISG 12 from the front wheels 28, 29 when the engine is being started and stopped.

FIG. 1 also shows subsystem controllers used in the dual-drive hybrid powertrain 10. These controllers include engine controller (ECU) 30, transmission controller (TCU) 32, motor controller (MCU) 34, generator controller (GCU) 36, high voltage traction battery controller (TBCM) 38, and a regenerative braking system (BSCM) 40. These controllers control the engine 16, transmission 18, ERAD 14, CISG 12, HV battery 22 and regenerative braking subsystems, respectively. In addition, a supervisory vehicle system controller (VSC) 42 communicates with the subsystem controllers for coordinating control between the engine, transmission, CISG and ERAD while operating and transitioning between the various powertrain operating modes. The VSC 42 manages and coordinates the drivetrain functions to satisfy the driver's request and balance the energy flow to and from the multiple power units. VSC 42 also ensures that the constraints of the high voltage battery power and voltage limits are met.

The Dual-Drive hybrid powertrain 11 provides various operating modes dependent on the state of the engine, transmission, CISG and ERAD. When engine 12 is off, ERAD 14 draws electric power from the battery 22 to propel the vehicle, called electric-drive operation.

When engine 16 is on and the transmission 18 is disengaged, i.e., the input clutches 44, 46 are both open or fully disengaged, the engine can drive the CISG 12, thereby generating electricity drawn by the ERAD 14 to propel the vehicle, called series-drive operation.

When engine 16 is on and the transmission 18 is engaged, the engine and the ERAD 14 can propel the vehicle concurrently through both axles 20, 24, respectively, called in parallel-drive operation.

In addition, part of the engine output power can be routed through the CISG 12 to the ERAD 14, which drives axle 24, called parallel-split-drive operation. A brief summary of the primary dual-drive hybrid powertrain operating modes is shown in FIG. 2.

A function within the vehicle system controller 42, called Powertrain Operating Mode (PTOM) control, is required to determine which mode the powertrain 10 should operate in for a given driver demand, vehicle and environmental operating conditions such that the driver's demand is satisfied while achieving optimal vehicle fuel efficiency. After selecting a desired operating mode, PTOM generates commands that coordinate the subsystems to transition from current operating mode to the desired operating mode. These transitions are made among electric-drive, series-drive and parallel-drive.

Figure 3:
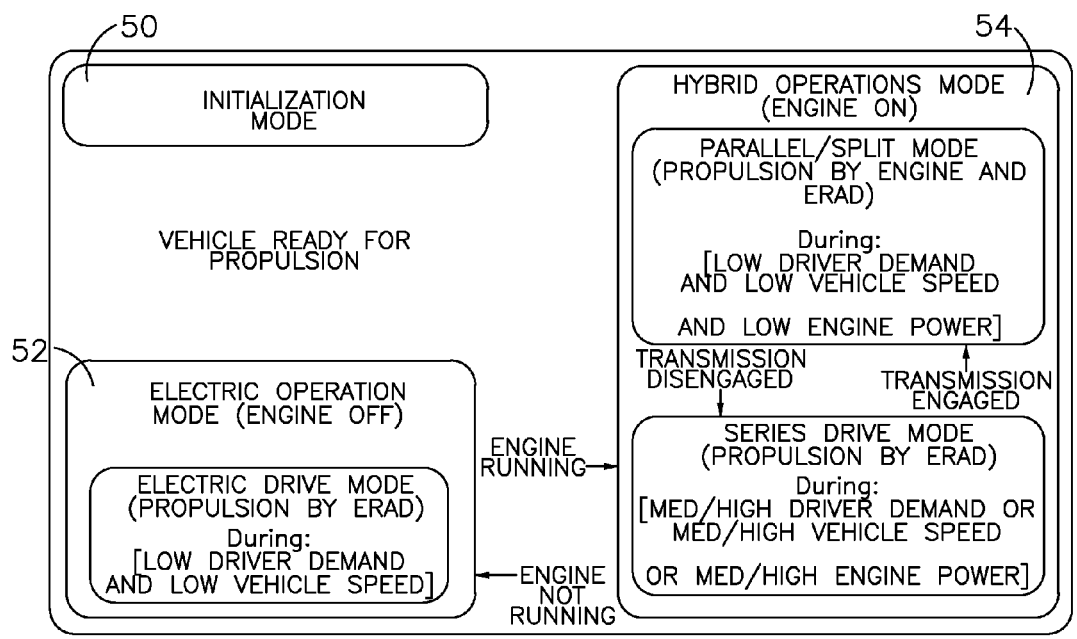
FIG. 3 shows the PTOM function in the form of a high level state diagram for the dual-drive hybrid system of FIG. 1.

The PTOM functions in the form of a high level state diagram for the dual-drive hybrid system. In the chart of FIG. 3, three super states are shown: Initialization Mode 50, electric-drive operation mode 52, and hybrid operation mode 54, which consists of series-drive and parallel-drive modes.

FIG. 3 also illustrates that after initialization PTOM control will operate the powertrain 10 in electric-drive until it determines that the engine 16 must be turned on based on driver inputs, vehicle conditions, and subsystems conditions. After the engine 16 is turned on, PTOM control will transition from electric-drive to either series-drive or to parallel-drive depending on transition conditions that are predefined based on system operating efficiency.

Figure 4:
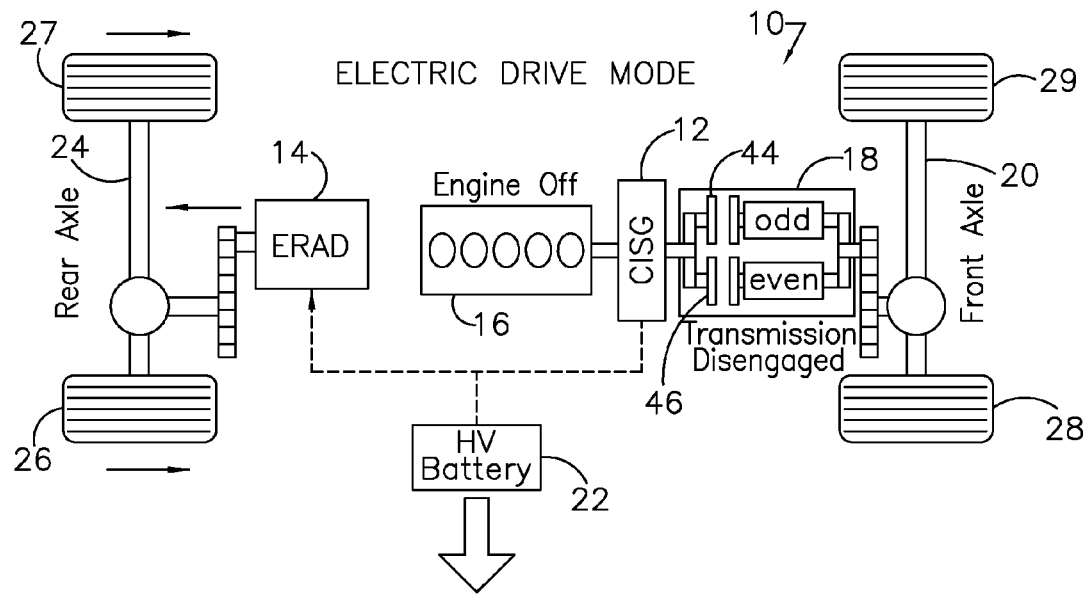
FIG. 4 is a schematic diagram showing electric and mechanical energy flow during a transition between electric-drive and parallel-drive in the powertrain of FIG. 1.
Figure 4:
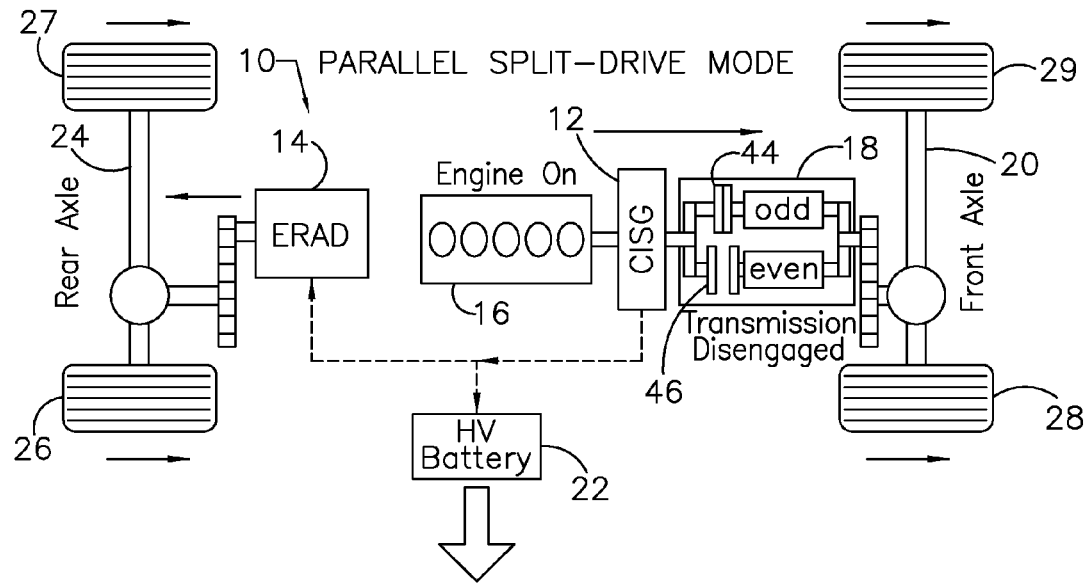

Powertrain transitions from electric drive to parallel-drive mainly occur when driver demanded wheel power is high, or when engine power demand is high, or when the vehicle speed exceeds a reference speed, e.g. 30 km/hr. As shown in FIG. 4, control of the drive operation transition from electric-drive to parallel-drive requires coordinating the change in propulsion torque delivery from rear-wheel drive to either front-wheel drive or all-wheel drive.

As FIG. 4 illustrates, in electric drive both input clutches 44, 46 are open, thereby disengaging the transmission 18. In parallel-drive, clutch 44 is closed and clutch 46 remains open, thereby permitting transmission 18 to transmit power in the odd-numbered gears to wheels 28, 29; however, in parallel-drive, clutch 44 can be open and clutch 46 closed permitting the transmission to transmit power in the even-numbered gears to wheels 28, 29.

Figure 5A:
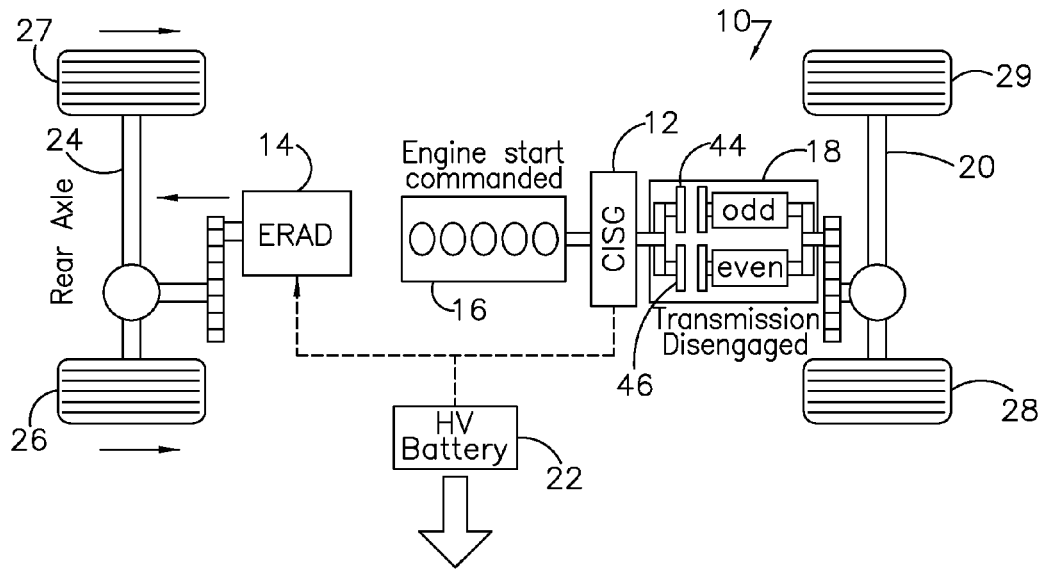
FIGS. 5A and 5B comprise a schematic diagram showing control phases for a transition from electric-drive to parallel-drive.
Figure 5A:
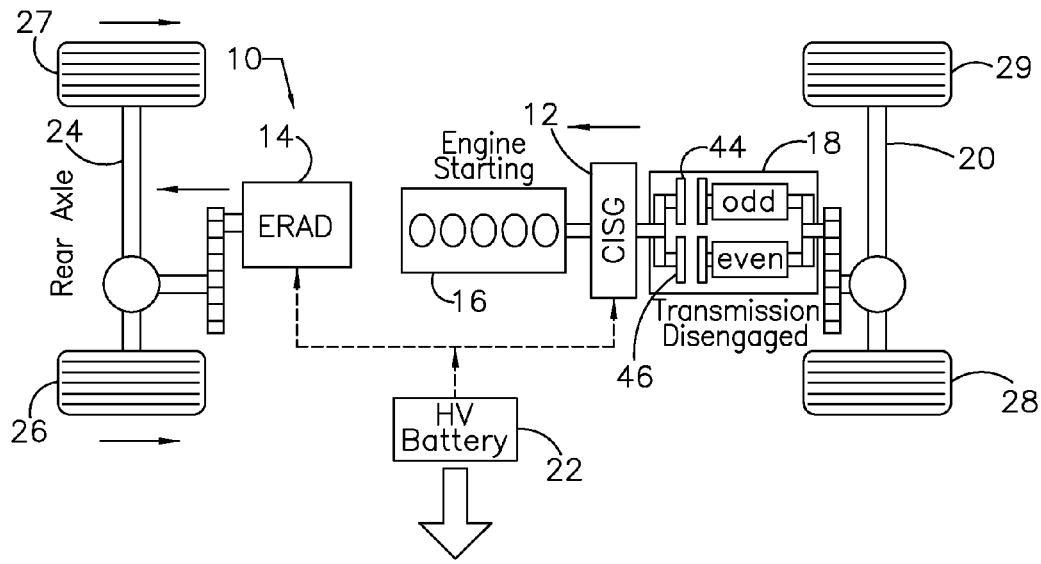
Figure 5B:
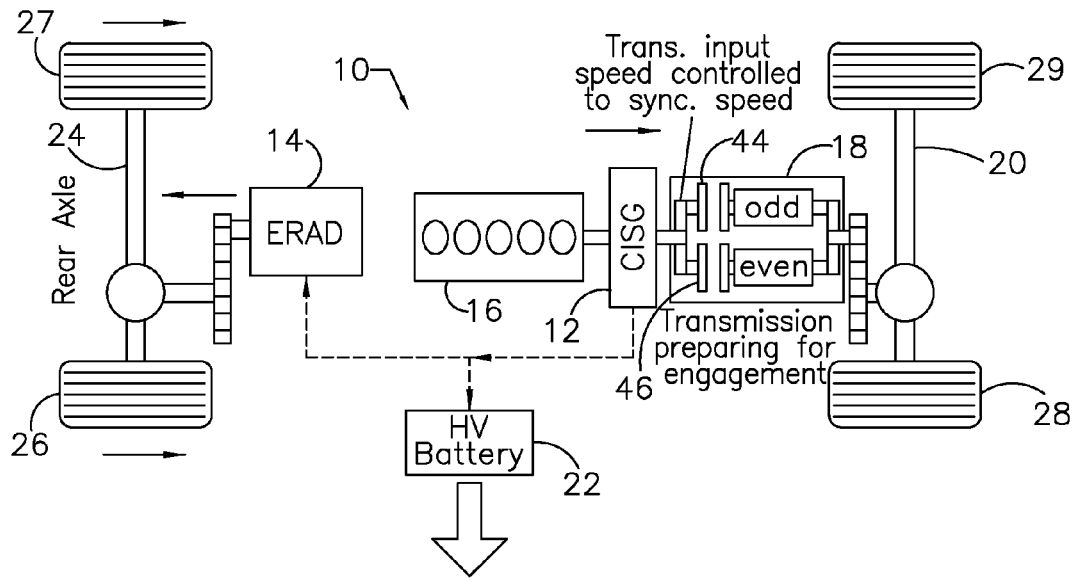
Figure 5B:
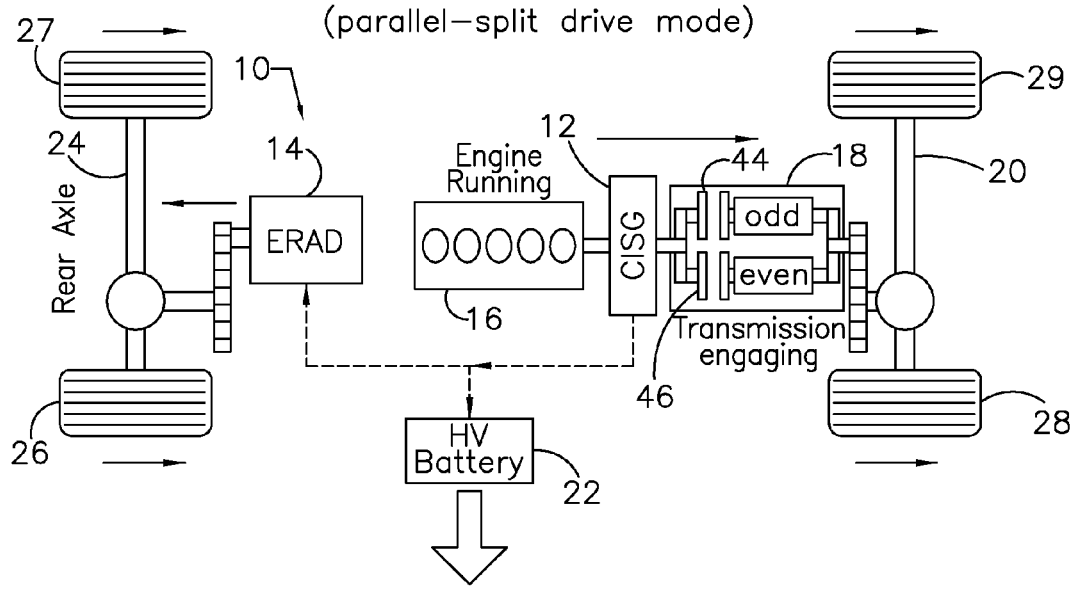
Figure 6:
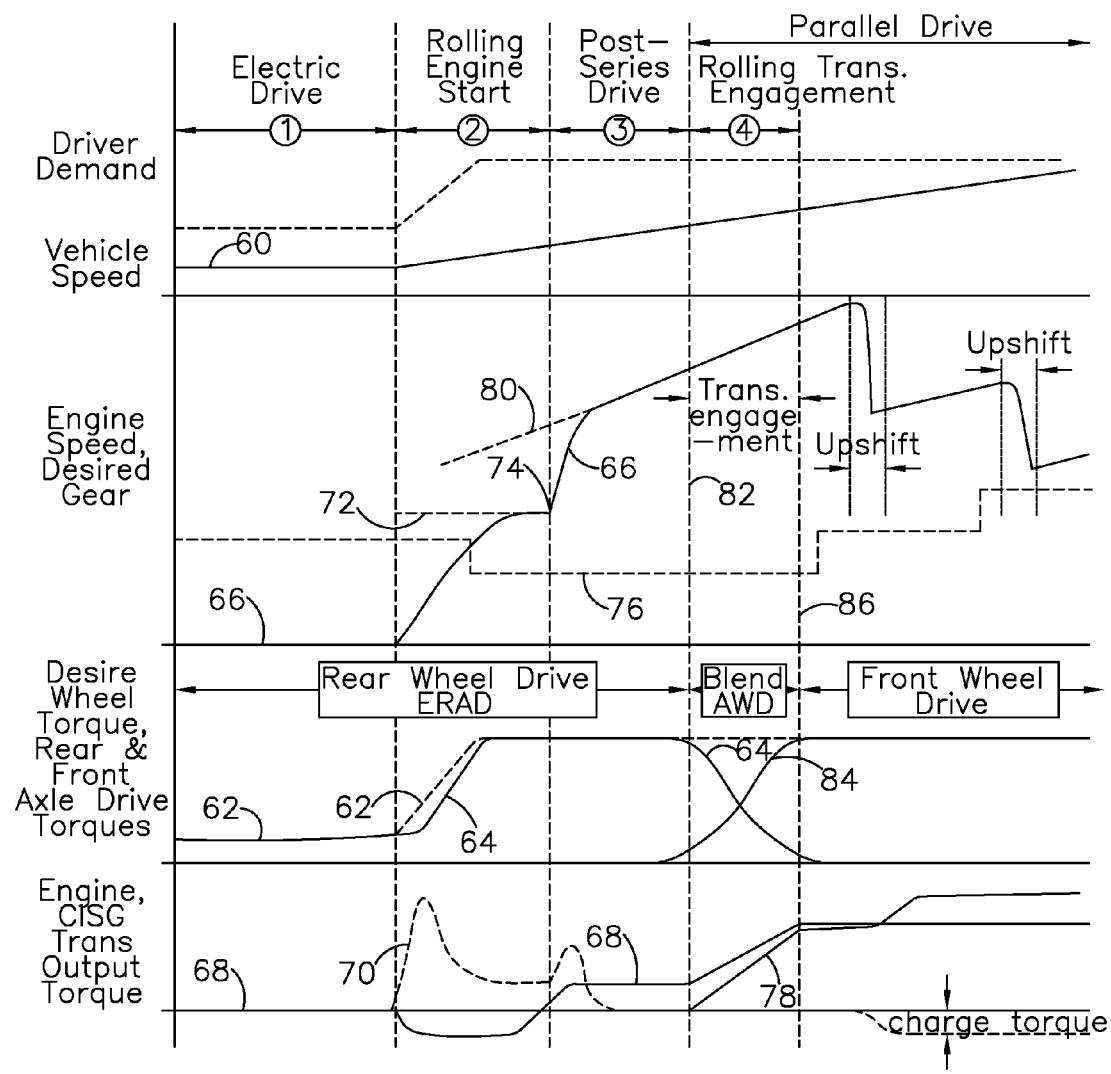
FIG. 6 is a graph showing the variation of various parameters of the powertrain of FIG. 1 during a transition from electric-drive to parallel-drive.

The key control system performance objective is to provide uninterrupted propulsion torque delivery during the electric-drive to parallel-drive transition while providing smooth and responsive vehicle performance. Any delays, harshness, or propulsion torque disturbances during this maneuver results in unacceptable drivability, NVH, degraded fuel economy and poor vehicle performance perception by the driver. Additional factors further affecting vehicle drivability and performance during these transitions include: engine start delays, transmission hardware response delays, tack of transmission actuation capability before engine start, simultaneous transmission shifts during the engine start, driver demand changes during the transition, crankshaft (engine/CISG) torque & speed stability, and crankshaft (engine/CISG) speed synchronization In order to achieve the performance objectives, the electric-drive to parallel-drive control was divided into four major sequential phases of control as shown in FIGS. 5A, 5B and 6 following a VSC command to transition to parallel-drive.

ELECTRIC DRIVE—During the first control phase, the vehicle is initially cruising at a vehicle speed 60 of about 20 km/hr in electric-drive with all of the vehicle propulsion provided by ERAD 14 to wheels 26, 27 through axle 24. The driver demanded wheel torque 62 is relatively low and is achieved alone using ERAD torque 64 while engine speed 66, engine torque 68, and CISG torque 70 are zero. When the driver depresses the accelerator pedal 48, the VSC 42 requests a transition to parallel-drive in order to meet the increase in demanded wheel torque 62 and causing the engine 16 to start. The control system then initiates the second control phase to perform a rolling engine start while the vehicle is moving.

ROLLING ENGINE START—During the second control phase while the engine is running, wheels 26, 27 are driven through axle 24, and ERAD torque 64 increases according to the increase in the driver demanded wheel torque represented by accelerator pedal depression. The CISG 12 is operated in a speed control mode in order to increase engine speed 66 to the target idle speed 72 before engine combustion begins at 74. As shown in FIG. 6, the CISG torque 70 initially increases as the engine accelerates to the idle speed target 72 and decreases to a level required to keep the engine shaft rotating. Once the engine speed is controlled to the idle speed, the engine is started while continuing to operate the CISG in speed control. This ensures a smooth and responsive engine start with robust engine speed control. During the engine spin-up and engine start, the transmission clutches 44, 46 are disengaged to ensure that the CISG and engine are decoupled from axle 20 and drive wheels 28, 29. This reduces engine start torque disturbances from being transmitted to the drive wheels 26, 27 and minimizes the potential for engine stall occurring during the engine start. Once the engine is running, the control system initiates the third control phase.

POST-SERIES DRIVE—During the third control phase, the transmission is preparing to engage the desired gear 76, but is not yet transmitting transmission output torque 78 to the wheels 28, 29. The engine 16 is running and the vehicle is driven by ERAD 14 using the energy produced by the engine. The CISG 16 is operating in a generating mode in order to convert the engine's mechanical energy into electrical energy to power the ERAD 14. The high voltage battery 22 may also be charged at the same time, if its state-of-charge has sufficiently decreased. During the third control phase, the CISG 12 is also used to control engine speed 66 to the transmission synchronous speed 80 corresponding to the driver desired gear 76 in order to ensure a smooth transmission engagement. By increasing engine speed 66 to the transmission synchronous speed 80, the slip across the oncoming clutch 44 is reduced to near zero speed. This helps achieve acceptable drivability and ensures a smooth transition to parallel-drive once the transmission engagement occurs. The transmission 14 is also preparing for an engagement by filling and stroking the oncoming clutch 44. Since a transmission downshift is most likely requested when driver demanded wheel torque increases, the transmission gearbox may also need to downshift to the new desired gear before engaging the oncoming clutch 44. While the engine is off, the wet-clutch DCT 18 loses actuation capability due to the loss of hydraulic line pressure and may not begin preparing for the engagement to the desired gear until the engine has started. During any transmission downshift or engagement preparation delays, the ERAD 14 is used in order to ensure uninterrupted propulsion torque to the wheels 26, 27. Once the transmission is ready to start the engagement, the control system initiates the fourth control phase.

ROLLING TRANSMISSION ENGAGEMENT (PARALLEL-DRIVE)—As transmission engagement starts at 82 while the vehicle is moving, the torque capacity of oncoming clutch 44 increases and the transmission begins to transmit the combined engine and CISG torque 84 to the wheels 28, 29. The vehicle operates in parallel-drive since the axle 20 is also propelling the vehicle. As shown in FIG. 6, the transmission output and front axle torque 84 increases as the transmission is engaging. The transmission output torque 78 increase is directly related to the torque capacity of oncoming clutch 44 and net engine torque being transmitted to the transmission input shaft 49. During transmission engagement, the ERAD torque 64 driving axle 24 is decreased in proportion to the increase in transmission output torque 78 driving the front axle. This ensures continuous torque delivery to the wheels as vehicle propulsion shifts from rear wheel to front wheel drive.

Once the transmission engagement is completed at 86, all of the engine and CISG torque 84 is transmitted to the wheels 28, 29. The high voltage battery 22 may also be charged using the CISG 12 by increasing the engine torque according to a required charge torque level. Alternatively, after the transmission engagement is completed 86, because of the dual-drive hybrid powertrain 10 degrees of freedom, the VSC 42 may still operate the vehicle in an all-wheel drive by using the ERAD 14 to provide a portion of the driver demanded wheel torque 62 through the axle 24 and using the engine and CISG to provide the remaining portion through axle 20 in order to maximize fuel efficiency. The blending of power and propulsion torque from the multiple power sources is a decision of the dual-drive energy management control system.

In accordance with the provisions of the patent statutes, the preferred embodiment has been described. However, it should be noted that the alternate embodiments can be practiced otherwise than as specifically illustrated and described.

The invention claimed is:

1. A method for operating a powertrain, comprising:
    (a) driving first wheels using an electric machine;
    (b) starting an engine while using a second electric machine to crank the engine;
    (c) using the second electric machine as a generator and the engine to produce synchronous speed across a clutch of a transmission having a gear engaged and connected to second wheels;
    (d) engaging the clutch to connect the engine through the transmission to the second wheels.

2. The method of claim 1, wherein step (b) is performed in response to demanded wheel torque.

3. The method of claim 1, wherein step (a) further includes:
    increasing torque produced by the electric machine as driver demanded wheel torque increases.

4. The method of claim 1, further comprising:
    using the second electric machine to increase engine speed to a target idle speed before engine combustion begins.

5. The method of claim 1, wherein step (b) further includes:
    using the second electric machine driven by the engine to generate electric power that is used to drive the electric machine.

6. The method of claim 1, wherein step (c) further includes:
    using the second electric machine driven by the engine to generate electric power that is stored in a battery.

7. The method of claim 1, wherein step (d) further includes:
    filling and stroking said clutch before engaging the clutch.

8. The method of claim 1, further comprising:
    using the electric machine to produce torque at the first wheels while the engine is off and during a delay in transmitting torque through the transmission.

9. The method of claim 1, wherein step (d) further includes:
    continuing to drive the first wheels using the electric machine while using the engine and the transmission to drive the second wheels.

10. The method of claim 1, further comprising:
    after the clutch is engaged, increasing an engine torque and a torque capacity of the clutch while using the engine and the transmission to drive the second wheels.

11. The method of claim 1, further comprising:
    decreasing torque produced by the electric machine as transmission output torque increases.

12. The method of claim 1, further comprising:
    after the clutch is engaged, increasing torque produced by the engine;
    using the second electric machine to produce electric energy; and
    storing said electric energy in a battery.

13. A method for operating a vehicle powertrain, comprising:
    (a) driving first wheels using an electric machine;

(b) starting an engine while using a second electric machine to crank the engine;
(c) using the second electric machine as a generator and the engine to produce synchronous speed across a clutch of a transmission having a gear engaged and driveably connected to second wheels;
(d) engaging the clutch to connect the engine through the transmission to the second wheels while reducing torque produced by the electric machine.

14. The method of claim 13, wherein step (b) further includes:
maintaining the second electric machine and the engine disengaged from the second wheels.

15. The method of claim 13, wherein step (c) further includes:
using the second electric machine driven by the engine to generate electric power that is used to drive the electric machine.

16. The method of claim 13, wherein step (c) further includes:
using the second electric machine driven by the engine to generate electric power that is stored in a battery.

17. The method of claim 13, wherein step (d) further includes:
filling and stroking said clutch before engaging the clutch.

18. The method of claim 13, wherein step (d) further includes:
continuing to drive the first wheels using the electric machine while using the engine and the transmission to drive the second wheels.

19. The method of claim 13, further comprising:
after the clutch is engaged, increasing an engine torque and a torque capacity of the clutch while using the engine and the transmission to drive the second wheels.

20. The method of claim 13, further comprising:
decreasing torque produced by the electric machine as transmission output torque increases.

21. The method of claim 13, further comprising:
after the clutch is engaged, increasing torque produced by the engine;
using the second electric machine to produce electric energy; and
storing said electric energy in a battery.

* * * * *